United States Patent
De'Longhi et al.

(10) Patent No.: US 11,375,846 B2
(45) Date of Patent: Jul. 5, 2022

(54) INFUSER UNIT FOR A COFFEE MACHINE

(71) Applicant: De'Longhi Appliances S.R.L., Treviso (IT)

(72) Inventors: Giuseppe De'Longhi, Treviso (IT); Floriano Franzon, Vazzola (IT)

(73) Assignee: De'Longhi Appliances S.r.L., Treviso (IT)

( * ) Notice: Subject to any disclaimer, the term of this patent is extended or adjusted under 35 U.S.C. 154(b) by 653 days.

(21) Appl. No.: 16/322,658

(22) PCT Filed: Jul. 26, 2017

(86) PCT No.: PCT/EP2017/068910
§ 371 (c)(1),
(2) Date: Feb. 1, 2019

(87) PCT Pub. No.: WO2018/024579
PCT Pub. Date: Feb. 8, 2018

(65) Prior Publication Data
US 2021/0330116 A1 Oct. 28, 2021

(30) Foreign Application Priority Data
Aug. 4, 2016 (IT) .......................... 102016000082419

(51) Int. Cl.
*A47J 31/36* (2006.01)
*A47J 31/44* (2006.01)
*A47J 31/24* (2006.01)

(52) U.S. Cl.
CPC .......... *A47J 31/3638* (2013.01); *A47J 31/36* (2013.01); *A47J 31/3604* (2013.01); *A47J 31/4403* (2013.01); *A47J 31/24* (2013.01)

(58) Field of Classification Search
CPC .. A47J 31/24; A47J 31/34; A47J 31/36; A47J 31/3604
(Continued)

(56) References Cited

U.S. PATENT DOCUMENTS 3,934,456 A   1/1976 Munk
4,915,355 A * 4/1990 Fort .......................... F16K 1/46
                                              251/356
(Continued)

FOREIGN PATENT DOCUMENTS

EP    0928591 A1    7/1999
WO    2010100600 A1  9/2010
WO    2013098096 A1  7/2013

OTHER PUBLICATIONS

International Search Report dated Sep. 29, 2017; International Application No. PCT/EP2017/068910; International Filing Date: Jul. 26, 2017; 4 pages.

(Continued)

*Primary Examiner* — Reginald Alexander
(74) *Attorney, Agent, or Firm* — Blank Rome LLP (57) ABSTRACT

An infuser unit (1) includes a closing piston (3) and an infusion cylinder (2) which are axially movable selectively or in combination for reciprocal engagement and disengagement to close and open an infusion chamber inside the infusion cylinder (2). An ejection piston (5), engaged in the infusion cylinder (2) and axially movable to expel spent coffee grounds, can also be included. A first radial hydraulic sealing means may be located between the closing piston (3) and the infusion cylinder (2), and a second radial hydraulic sealing means may be located between the infusion cylinder (2) and the ejection piston (5), where at least one of the first and the second hydraulic sealing means has at least one seal (100, 101) having an anti-friction surface coating made of a material free of grease and lubricating oils and compatible with use in contact with foodstuffs and drinking water.

6 Claims, 7 Drawing Sheets

(58) Field of Classification Search
USPC .......................................................... 99/302 P
See application file for complete search history.

(56) References Cited

U.S. PATENT DOCUMENTS

| | | | |
|---|---|---|---|
| 8,794,127 B2* | 8/2014 | Nosler | A47J 31/42 |
| | | | 99/297 |
| 2004/0157035 A1* | 8/2004 | Guizzetti | F16J 15/104 |
| | | | 428/66.6 |
| 2011/0123905 A1* | 5/2011 | Nakamura | H01M 8/04186 |
| | | | 429/515 |
| 2013/0069363 A1* | 3/2013 | Lutzer | B64D 11/02 |
| | | | 285/298 |
| 2016/0276746 A1* | 9/2016 | Mielke | H01Q 3/04 |
| 2018/0209543 A1* | 7/2018 | Nachtmann | F16J 15/022 |

OTHER PUBLICATIONS

Written Opinion dated Sep. 29, 2017; International Application No. PCT/EP2017/068910; International Filing Date Jul. 26, 2017; 6 pages.

* cited by examiner

INFUSER UNIT FOR A COFFEE MACHINE

RELATED APPLICATIONS

This application is a U.S. national phase application of International Application No. PCT/EP2017/068910, filed Jul. 26, 2017; which application claims benefit of priority of Italy Application No. 102016000082419, filed Aug. 4, 2016. Each of the above-identified related applications are incorporated by reference.

FIELD OF USE

The present invention relates to an infuser unit for a coffee machine.

BACKGROUND OF THE INVENTION

The infuser unit to which reference is made is of the type having an infusion cylinder subjectable to a reversible movement from a position of disengagement to a position of engagement with a closing piston so as to create an infusion chamber into which the infusion water heated by a boiler is conveyed through a suitable channel inside the closing piston.

The infusion cylinder has an ejection piston inside it which moves in a coordinated fashion with a scraper element in order to discharge the spent coffee grounds.

One of the critical aspects of these types of coffee machines lies in the friction generated in the infuser unit as a result of the axial movements between the infusion cylinder and closing piston, and between the ejection piston and infusion cylinder.

In order to limit the friction between the moving parts, toroidal or lip-shaped hydraulic O-ring seals are provided which must withstand pressures of up to 15-20 bar.

In the present solutions, the O-rings are greased with specific products, namely, greases approved as suitable for use with food products.

However, such greases are generally not also approved as suitable for use with drinking water. These solutions give rise to the need to introduce grease manually in the product line, an operation that entails large variability tied to the operator and complicates the in-line management and supply of materials.

Some coffee machine manufacturers even provide a grease kit for re-lubricating these critical parts, included in the packages of the machines.

The technical task of the present invention is thus to provide an infuser unit for a coffee machine which enables the aforementioned technical drawbacks of the prior art to be overcome.

SUMMARY OF THE INVENTION

Within the scope of this technical task, one object of the invention is to provide an infuser unit for a coffee machine which ensures a reduction in the friction between the moving parts while at the same time simplifying the production line in such a way as to improve the productivity thereof.

Another object of the invention is to provide an infuser unit for a coffee machine such that the necessary reduction in the friction between the moving parts is achievable irrespective of the ability of the operator in the production line.

Another object of the invention is to provide an infuser unit for a coffee machine which ensures a reduction in routine maintenance.

The technical task, as well as these and other objects, according to the present invention, are achieved by an infuser unit for a coffee machine comprising a closing piston and an infusion cylinder which are axially movable selectively or in combination for reciprocal engagement and disengagement so as to close and open an infusion chamber inside the infusion cylinder, in which a dose of coffee can be positioned, an ejection piston engaged in the infusion cylinder and axially movable in the infusion cylinder so as to expel the spent coffee grounds, a first radial hydraulic sealing means between said closing piston and said infusion cylinder, and a second radial hydraulic sealing means between said infusion cylinder and said ejection piston, characterised in that at least one between said first hydraulic sealing means and said second hydraulic sealing means comprises at least one seal having an anti-friction surface coating made of a material free of grease and lubricating oils and compatible with use in contact with foodstuffs and drinking water.

In a preferred embodiment of the invention, said coating has a uniform thickness and entirely coats said seal.

In a preferred embodiment of the invention, both said first hydraulic sealing means and said second hydraulic sealing means comprise at least one seal having an anti-friction surface coating made of a material free of grease and lubricating oils and compatible with use in contact with foodstuffs and drinking water.

In a preferred embodiment of the invention, at least one between said first hydraulic sealing means and said second hydraulic sealing means comprises at least two seals having an anti-friction surface coating made of a material free of grease and lubricating oils and compatible with use in contact with foodstuffs and drinking water.

In a preferred embodiment of the invention, said surface coating comprises a fluoropolymer or a mixture of fluoropolymers.

In a preferred embodiment of the invention said seal is made of NBR or silicone rubber.

In a preferred embodiment of the invention, said coating has a uniform thickness of between 5 and 50μ.

The present invention further discloses a coffee machine that has such an infuser unit.

Among the advantages of the invention is the elimination of the need to manually introduce grease during in-line assembly, an operation that entails large variability tied to the operator, and the in-line management and supply of materials is simplified.

Moreover, the scheduled maintenance of the coffee machine is reduced, since the surface coating of the seal has adequate mechanical strength and thus an adequate life span under the operating conditions of the coffee machine.

BRIEF DESCRIPTION OF THE DRAWINGS

Additional features and advantages of the invention will become more apparent from the description of a preferred but not exclusive embodiment of the infuser unit according to the invention, illustrated by way of non-limiting example in the appended drawings, in which.

DETAILED DESCRIPTION OF THE ILLUSTRATED EMBODIMENTS

With reference to the aforementioned figures, they illustrate, solely by way of example, an infuser unit 1 of a known type, which for this reason will not be described in detail.

The scope of the invention thus extends beyond the specific construction of the coffee machine illustrated below.

Figure 1:
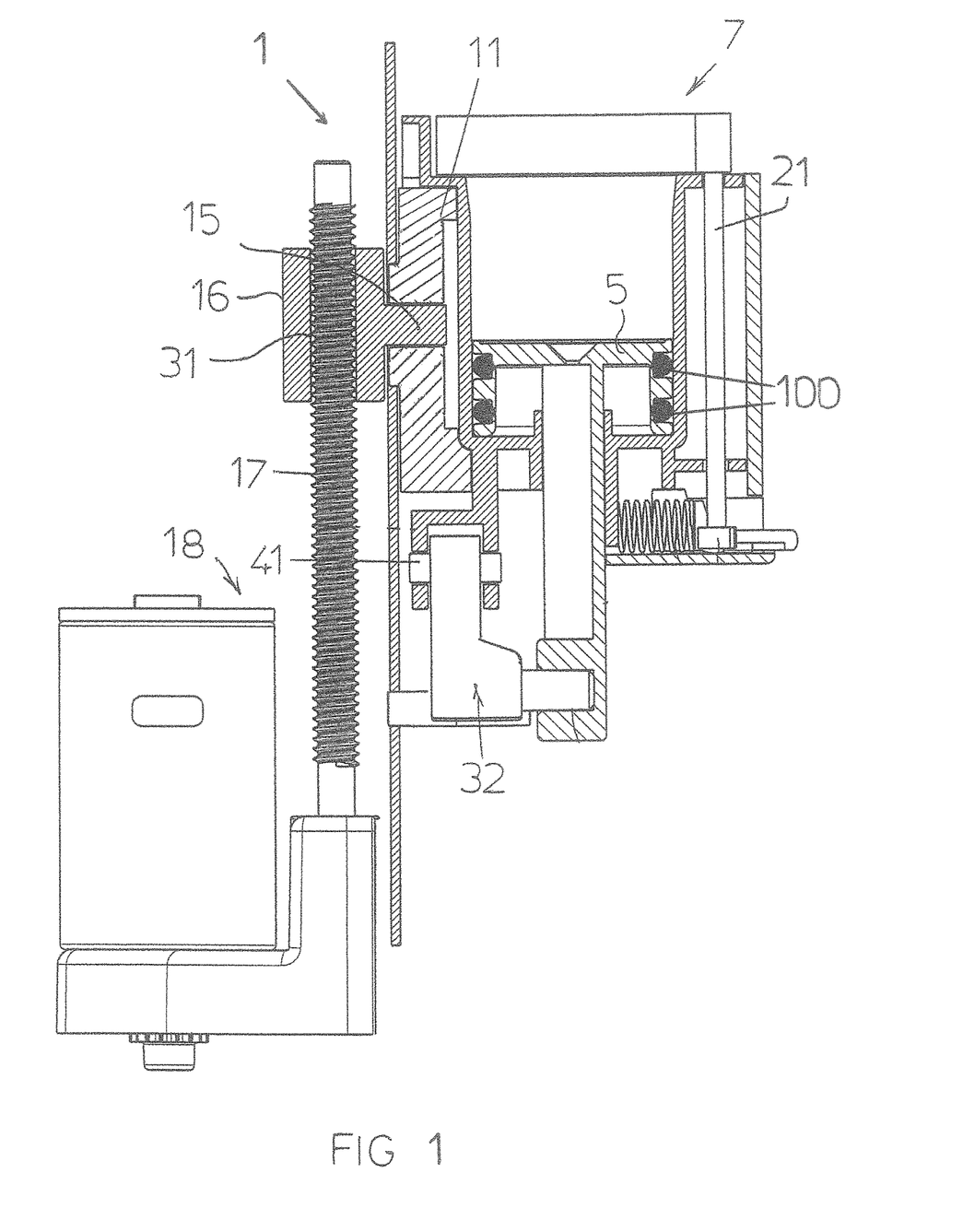
FIG. 1 shows a cross section of part of the infuser unit.

The infuser unit 1 comprises a hollow infusion cylinder 2 having an access mouth 8 engageable by a closing piston 3 so as to delimit an infusion chamber 4 in which a dose of coffee 30 suppliable by a loader 6 can be positioned, an ejection piston 5 for expelling the spent dose of coffee 30 from the infusion chamber 4, and an actuating means for the ejection piston 5.

The infusion cylinder 2 is subjectable to a reversible roto-translational stroke between a position for loading a dose of coffee 30, in which it is disengaged from the closing piston 3 and its axis is inclined relative to the axis of the closing piston 3, and an infusion position, in which it is engaged with the closing piston 3 and its axis lies in the direction of the axis of the closing piston 3.

The ejection piston 5 is slidable inside the infusion cylinder 2 in the direction of the axis of the infusion cylinder 2 between a retracted position and a projecting position for expelling the spent dose of coffee 30.

The infuser unit 1 further comprises a mobile scraper element 7 for scraping the access mouth 8 of the infusion cylinder 2.

The infusion cylinder 2 is removably fixed to a carriage 11 which is translatable in the direction of the axis of the closing piston 3.

The carriage 11 is oscillatably supported with an oscillation axis oriented in a direction orthogonal to its direction of translation.

In particular, the carriage 11 is oscillatably supported by a pin 15, which is supported in turn by a slider 16 internally comprising a screw nut 31 engaged with an endless screw 17 oriented in the direction of the axis of the closing piston 3 and movable by a gear motor 18.

In order to obtain the oscillation of the carriage 11, there is provided a fixed cam in the form of a slot 51 in which the pin 52 is engaged and carried by an extension 53 of the carriage 11.

In the infuser unit there is provided an oscillatable rocker 32 for drawing the ejection piston 5.

The rocker 32 is configured to pick up the oscillatory movement selectively from a first drive cam 37 configured and disposed in such a way as to generate an oscillation of the rocker 32 in the direction that corresponds to a drawing toward the projecting position of the ejection piston 5 or with a second drive cam 38 configured and disposed in such a way as to generate an oscillation of the rocker 32 in the direction that corresponds to a drawing toward the retracted position of the ejection piston 5.

The rocker 32 is pivoted by means of an oscillation pin 41 at a lower extension 42 of the infusion cylinder 2.

The operation of the infuser unit 1 is as follows.

Figure 2:
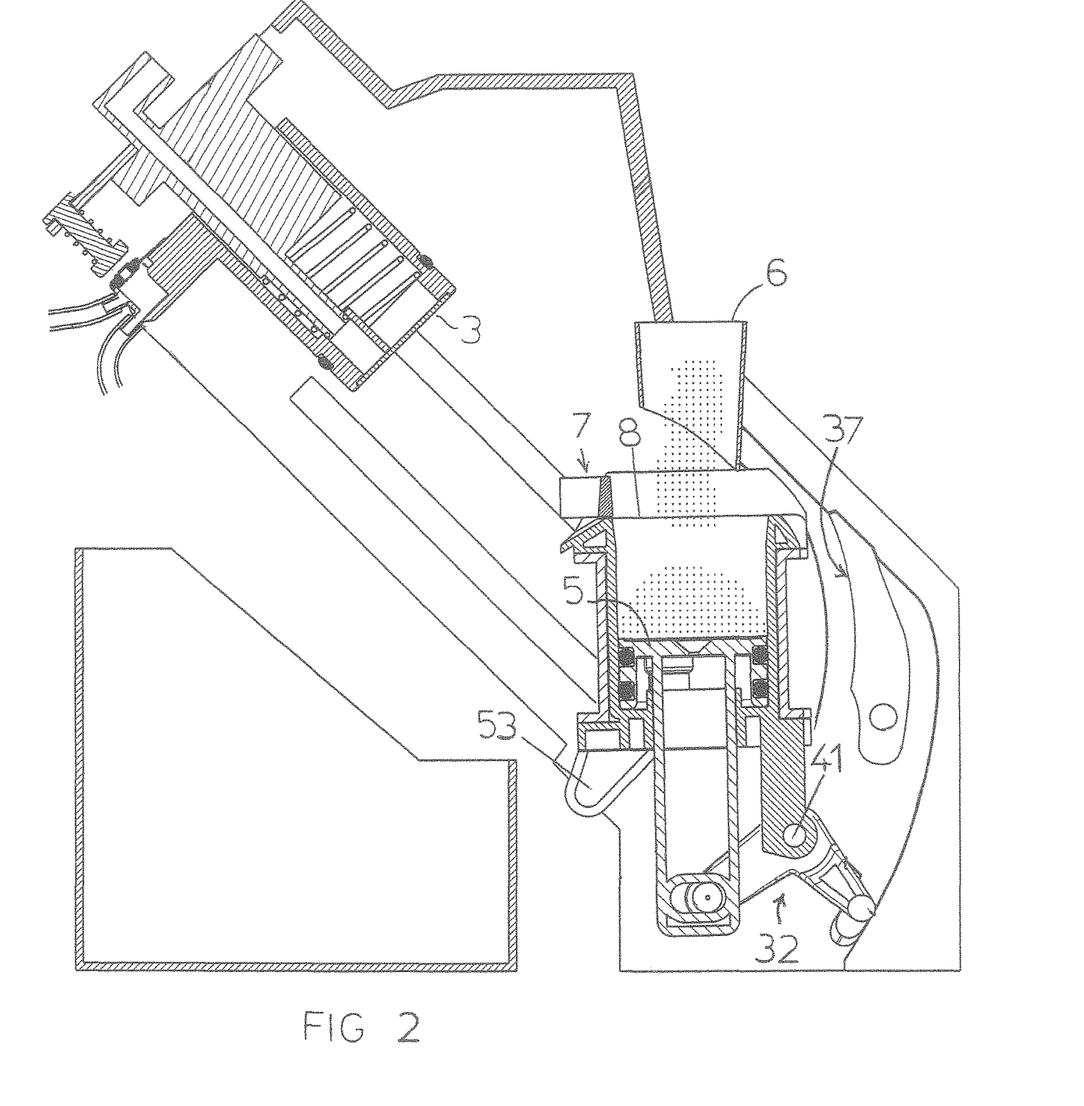
FIGS. 2-7 show the sequence of steps in the movement of the infuser unit when an infusion cycle is carried out.
Figure 3:
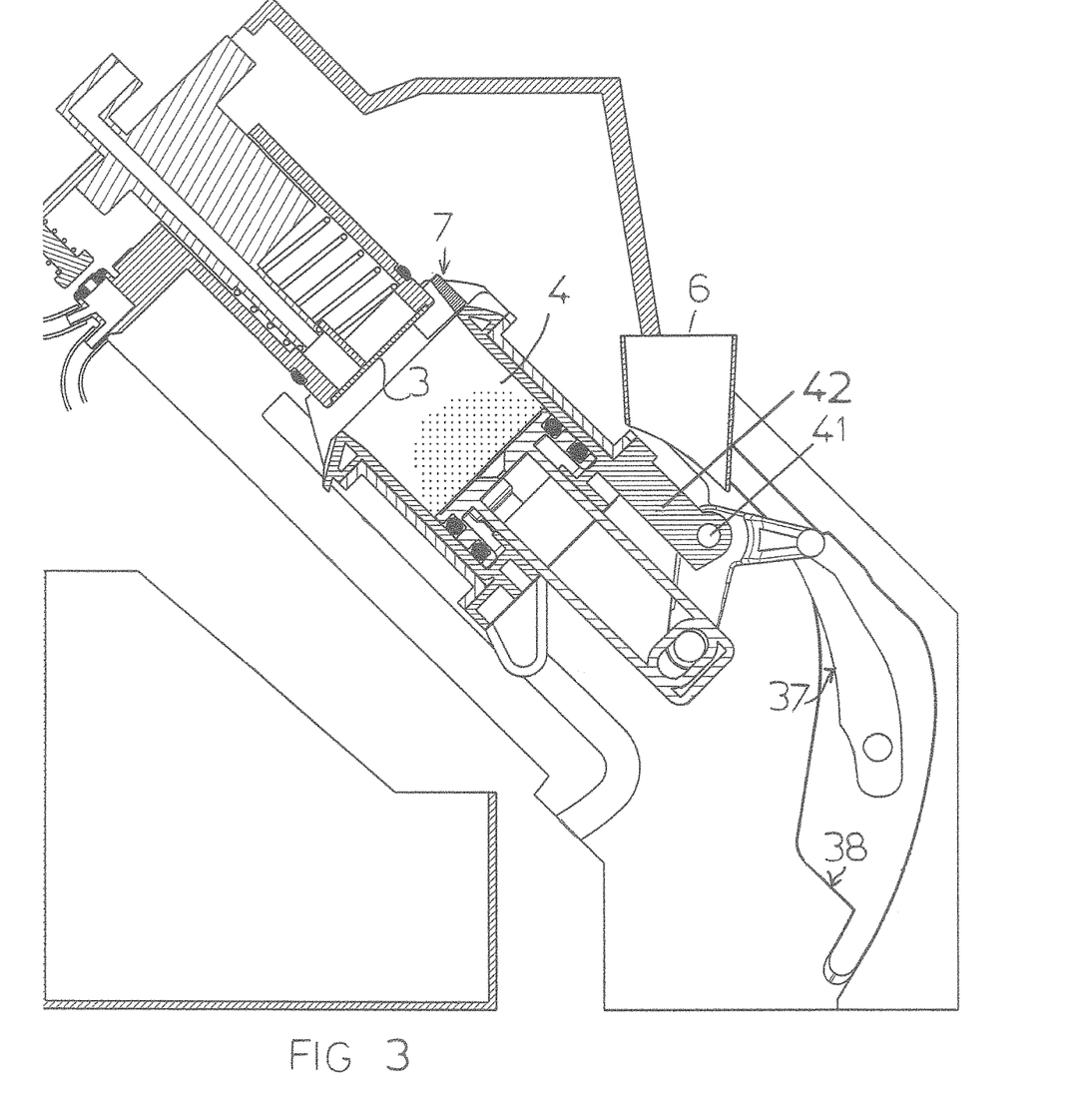
Figure 4:
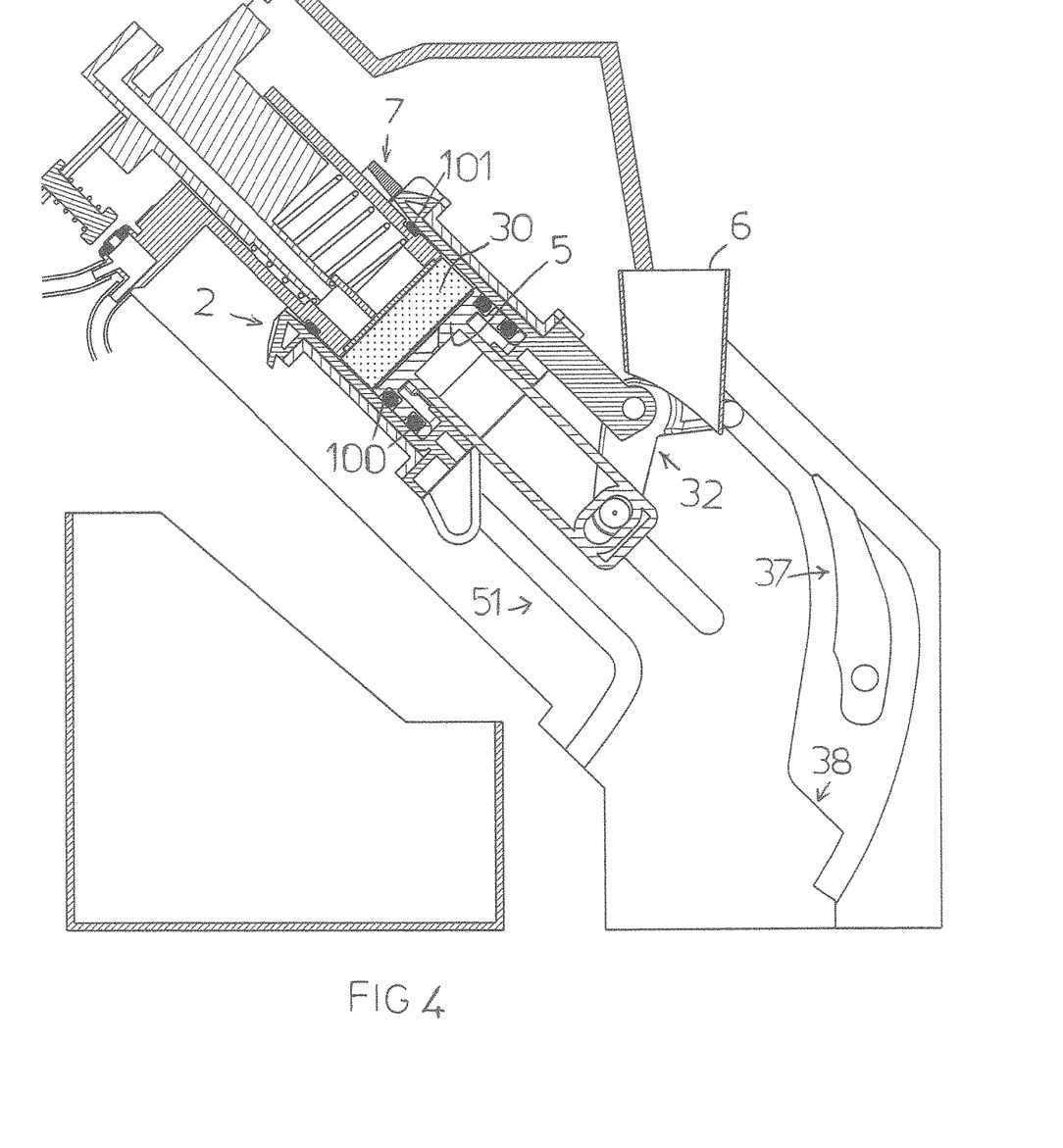
Figure 5:
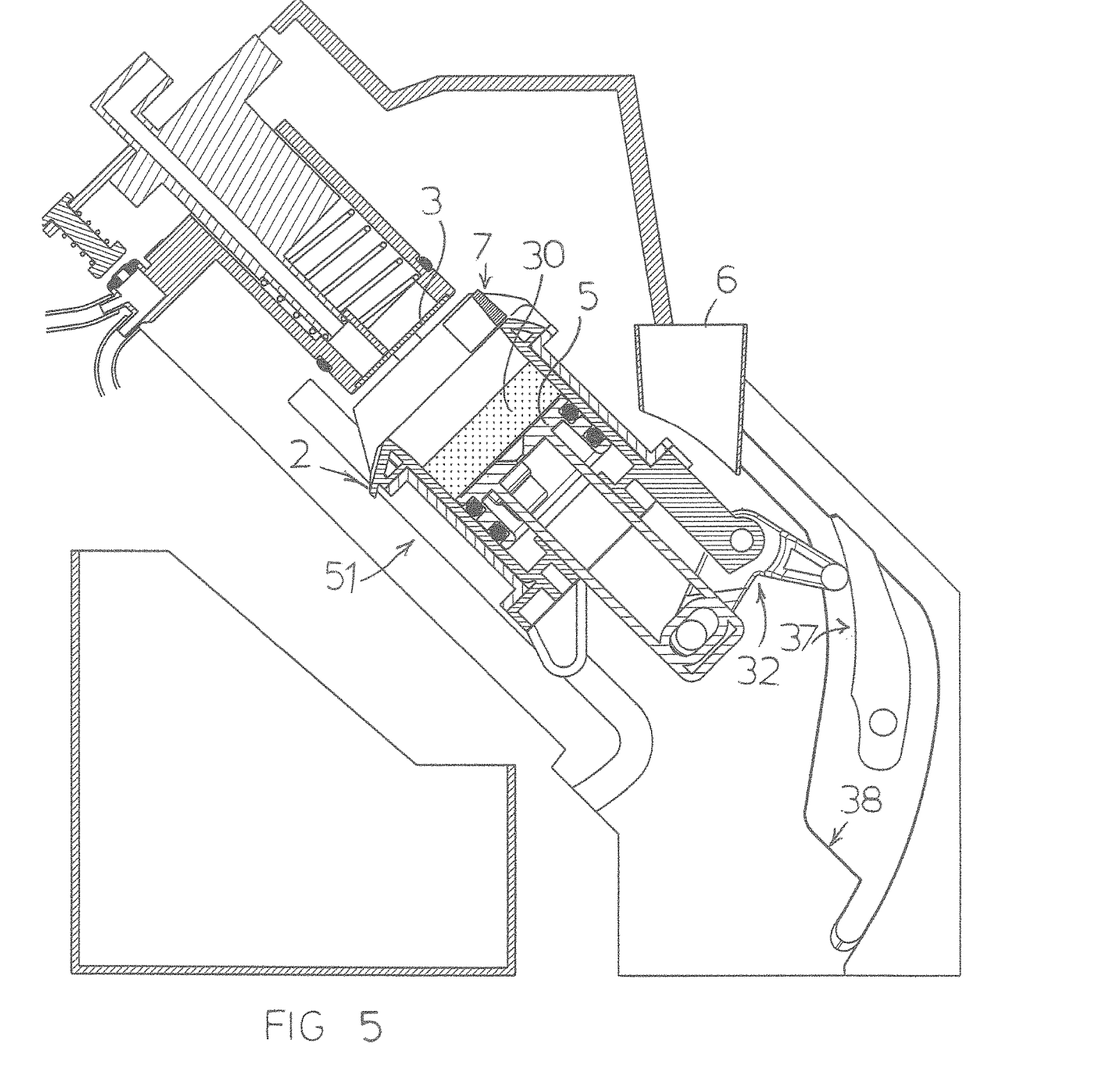
Figure 6:
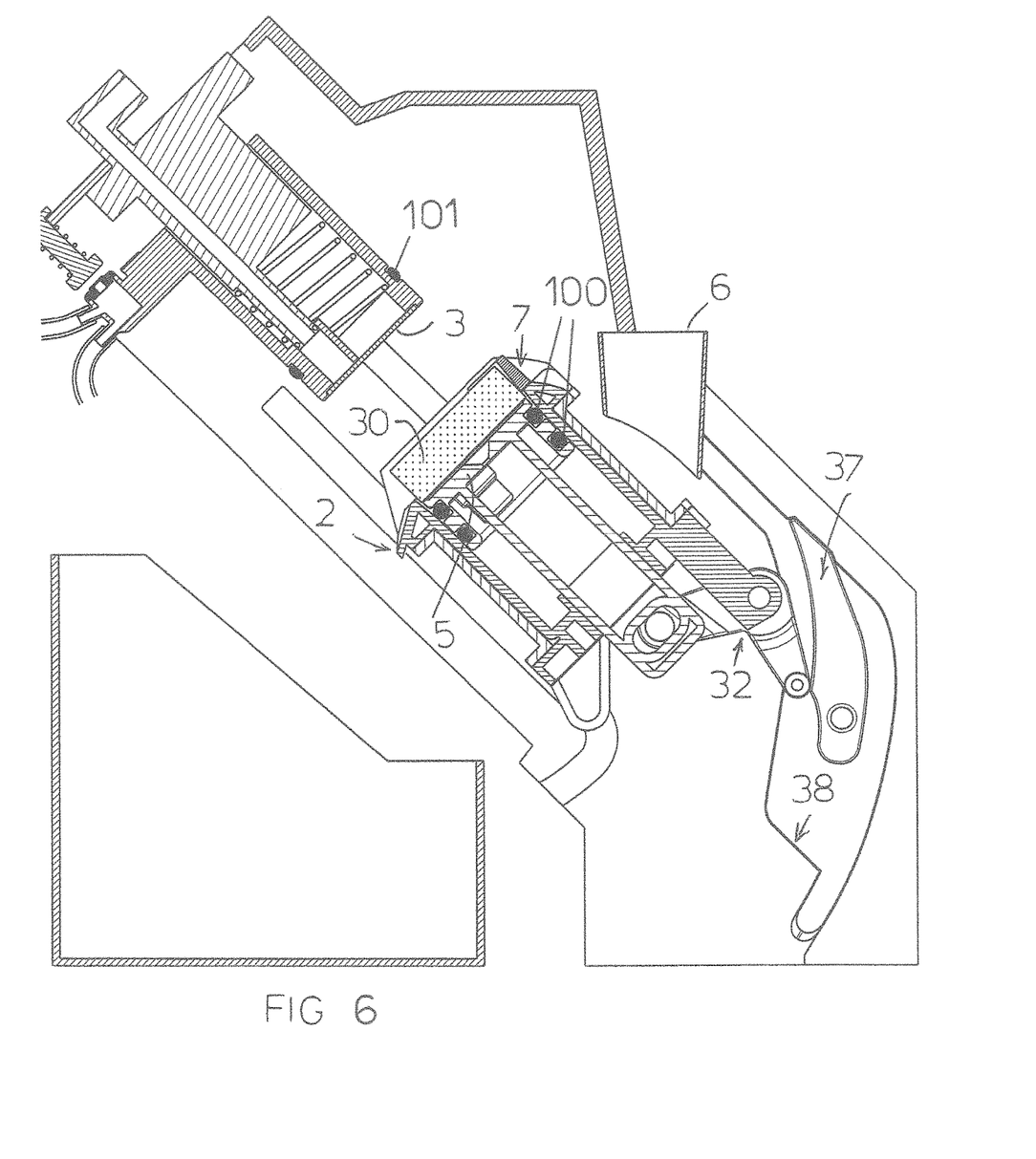
Figure 7:
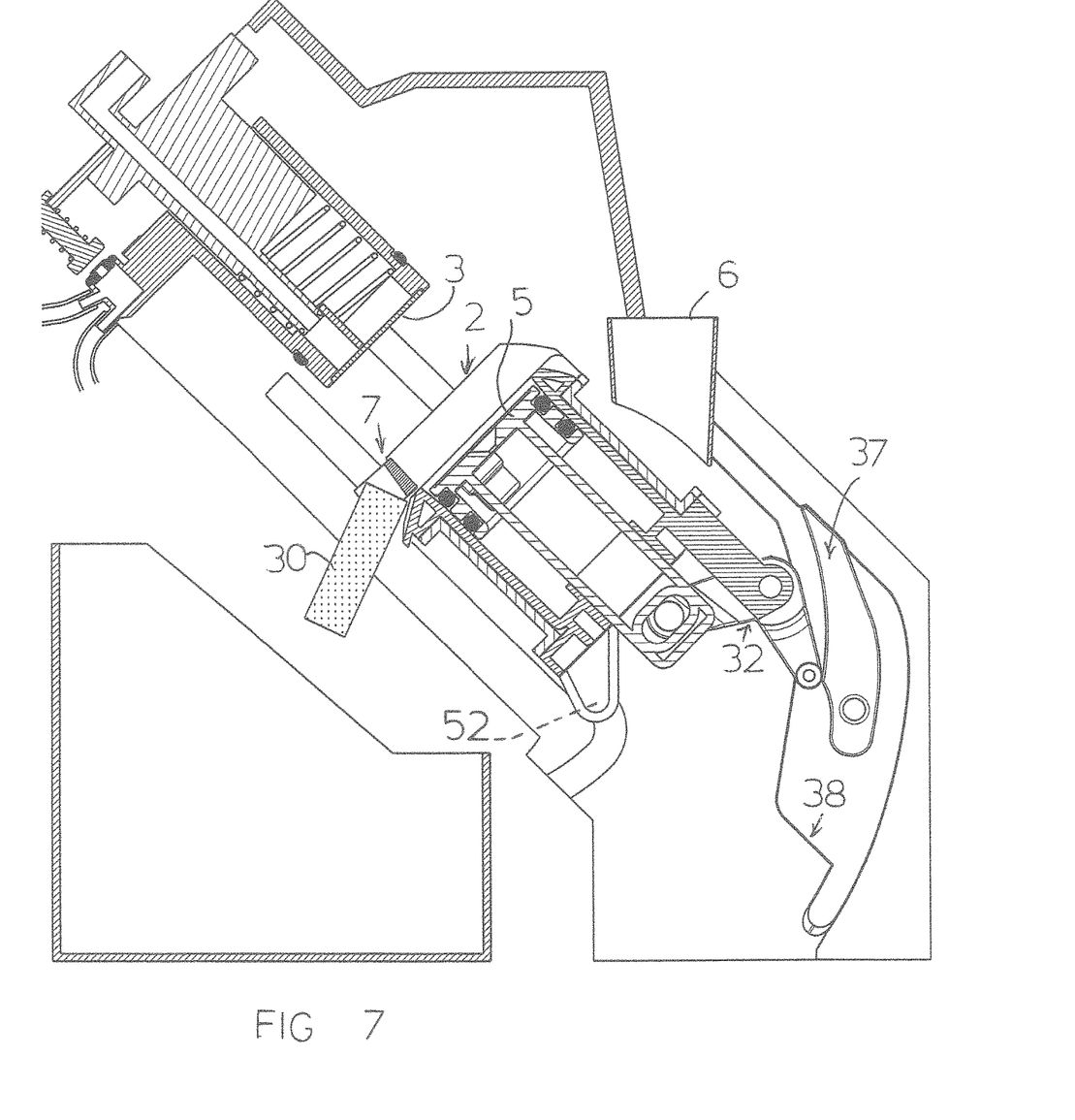

At the beginning of its stroke, the infusion cylinder 2 is below the loader 6 with its axis in a vertical direction or slightly inclined relative to the vertical direction. The ejection piston 5 is in a retracted position.

At the end of the step of loading the coffee powder in the infusion cylinder 2, the gear motor 18 drives the endless screw 17 in rotation 17; the slider 16 translates along the endless screw 17 as a result of the coupling therewith via the screw nut 31.

The carriage 11 pivoted to the slider 16 begins to draw the infusion cylinder 2 upward.

During the initial part of being drawn upward, the carriage 11 oscillates until orienting the infusion cylinder 2 with its axis aligned with the axis of the closing piston 3.

In the subsequent upward movement, the infusion cylinder 2 maintains the same angular orientation and then goes on to engage with the closing piston 3.

The infusion cylinder 2 stops in this position with the ejection piston 5 still in a retracted position.

For the infusion, the closing piston 3 is supplied with a flow of water suitably heated by a suitable boiler (not shown). The hot infusion water is injected into the infusion chamber and the resulting infusion is extracted through a suitable outlet hole provided in the infusion cylinder 2.

At the end the infusion, the downward movement of the infusion cylinder 2 begins, made possible by the reversal of the movement transmitted by the gear motor 18.

The infusion cylinder 2 concludes its descent with an oscillation that is opposite to the initial one, whereby it goes back into the position for loading a new dose of coffee 30.

During the oscillation of the infusion cylinder 2, the ejection piston 5 is drawn towards the retracted position.

The innovative aspect of the infuser unit 1 regards the specific nature of the hydraulic seals between the moving parts.

A first radial hydraulic sealing means is provided between the closing piston 3 and the infusion cylinder 2 and a second radial hydraulic sealing means between the infusion cylinder 2 and the ejection piston 5.

Advantageously, at least one and preferably both the first radial hydraulic sealing means and the second radial hydraulic sealing means comprise at least one seal 100, 101 having an anti-friction surface coating made of a material free of grease and lubricating oils and compatible with use in contact with foodstuffs and drinking water.

The illustrated solution envisages, purely by way of example, a seal 101 in the form of a toroidal O-ring between the closing piston 3 and the infusion cylinder 2, and two seals 100 in the form of a toroidal O-ring between the ejection piston 5 and the infusion cylinder 2.

These seals 100, 101 can be present in different numbers and/or shapes, for example they can be formed by lip seals.

The coating has a uniform thickness and entirely coats the seal 100, 101.

Advantageously, the surface coating comprises a fluoropolymer or a mixture of fluoropolymers.

The adoption of fluoropolymers such as PTFE (polytetrafluoroethylene), PFA (perfluoroalkoxy) and FEP (fluorinated ethylene propylene) has shown to be advantageous.

The coating can be present, for example, in the form of the product commercially known as Teflon® or Xylan®.

The surface coating has a uniform thickness of between 5 and 50µ.

The body of the seal 100, 101 is preferably made of NBR or silicone rubber or another material having equivalent characteristics.

The coating can be applied by conventional spraying wherein a dispersion of a solid low molecular weight fluoropolymer is in suspension in a liquid such as a solvent or water, which acts as a carrier destined later to evaporate, or by air spraying, or else by electrostatic spraying.

The surface coating can be of a multilayer type which includes a primer, optional intermediate layers, and a final layer.

The surface coating free of grease and lubricating oils alters the surface chemistry of the seal in such a way as to impart several characteristic properties to it.

The special surface coating of the seal 100, 101 ensures low friction and has the advantage of being suitable for use in contact with both foodstuffs and drinking water.

The infuser unit thus conceived is susceptible of numerous modifications and variants, all falling within the scope of the inventive concept; furthermore, all the details may be replaced with technically equivalent elements.

In practical terms, the invention may be applied to infuser units of coffee machines exhibiting a different movement among the parts, but which always comprise axial movements implying radial hydraulic sealing means, for example an axial movement also of the closing piston as well as of the infusion cylinder, or an axial movement only of the closing piston in the place of the infusion cylinder, which in such a case is subjected solely to a rotational movement between a position for loading the dose of coffee and a position of axial alignment with the closing piston. Finally, the materials used, as well as the dimensions, can be any according to need and of the state of the art.

The invention claimed is:

1. An infuser unit (1) for a coffee machine, comprising:
   a closing piston (3) and an infusion cylinder (2) which are axially movable selectively or in combination for reciprocal engagement and disengagement to close and open an infusion chamber inside the infusion cylinder (2), in which a dose of coffee can be positioned,
   an ejection piston (5) engaged in the infusion cylinder (2) and axially movable in the infusion cylinder (2) to expel spent coffee grounds,
   a first radial hydraulic sealing means between said closing piston (3) and said infusion cylinder (2), and
   a second radial hydraulic sealing means between said infusion cylinder (2) and said ejection piston (5),
   wherein at least one of said first hydraulic sealing means and said second hydraulic sealing means comprises at least one seal (100, 101) having a single, anti-friction surface coating, of uniform thickness, chemically bonded to a core of the at least one seal (100, 101), over an entirety of an outer perimeter of the core of the at least one seal (100, 101), where the core is NBR or silicone rubber, where the single coating is selected from the group consisting of PTFE (polytetrafluoroethylene), PFA (perfluoroalkoxy) and FEP (fluorinated ethylene propylene), where the coating is made of a material free of grease and lubricating oils and compatible with use in contact with foodstuffs and drinking water, and where the outer perimeter of the at least one seal (100, 101) is uncovered, and configured for direct, sliding, anti-friction contact with the closing piston (3), the infusion cylinder (2), or the ejection piston (5).

2. The infuser unit (1) for a coffee machine according to claim 1, wherein both said first hydraulic sealing means and said second hydraulic sealing means comprise at least one seal (100, 101) having a single, anti-friction surface coating, of uniform thickness, chemically bonded to a core of the at least one seal (100, 101), over an entirety of an outer perimeter of the core of the at least one seal (100, 101), where the core is NBR or silicone rubber, where the single coating is selected from the group consisting of PTFE (polytetrafluoroethylene), PFA (perfluoroalkoxy) and FEP (fluorinated ethylene propylene), where the coating is made of a material free of grease and lubricating oils and compatible with use in contact with foodstuffs and drinking water, and where the outer perimeter of the at least one seal (100, 101) is uncovered, and configured for direct, sliding, anti-friction contact with the closing piston (3), the infusion cylinder (2), or the ejection piston (5).

3. The infuser unit (1) for a coffee machine according to claim 1, wherein at least one of said first hydraulic sealing means and said second hydraulic sealing means comprises at least two seals (100, 101) having a single, anti-friction surface coating, of uniform thickness, chemically bonded to a core of the at least one seal (100, 101), over an entirety of an outer perimeter of the core of the at least one seal (100, 101), where the core is NBR or silicone rubber, where the single coating is selected from the group consisting of PTFE (polytetrafluoroethylene), PFA (perfluoroalkoxy) and FEP (fluorinated ethylene propylene), where the coating is made of a material free of grease and lubricating oils and compatible with use in contact with foodstuffs and drinking water, and where the outer perimeter of the at least one seal (100, 101) is uncovered, and configured for direct, sliding, anti-friction contact with the closing piston (3), the infusion cylinder (2), or the ejection piston (5).

4. The infuser unit (1) for a coffee machine according to claim 1, wherein said seal (100, 101) is a toroidal O-ring.

5. The infuser unit (1) for a coffee machine according to claim 1, wherein said single, anti-friction coating has a uniform thickness of between 5 and 50μ.

6. A coffee machine comprising an infuser unit according to claim 1.

* * * * *